US009239840B1

(12) United States Patent  (10) Patent No.: US 9,239,840 B1
Acharya  (45) Date of Patent: Jan. 19, 2016

(54) BACKUP MEDIA CONVERSION VIA INTELLIGENT VIRTUAL APPLIANCE ADAPTER

(75) Inventor: Soubir Acharya, Pleasantville, NY (US)

(73) Assignee: Swish Data Corporation, Warwick, NY (US)

(*) Notice: Subject to any disclaimer, the term of this patent is extended or adjusted under 35 U.S.C. 154(b) by 793 days.

(21) Appl. No.: 13/104,179

(22) Filed: May 10, 2011

Related U.S. Application Data

(63) Continuation-in-part of application No. 12/766,778, filed on Apr. 23, 2010, now Pat. No. 9,087,066.

(60) Provisional application No. 61/218,419, filed on Jun. 19, 2009, provisional application No. 61/176,098, filed on May 6, 2009, provisional application No. 61/172,218, filed on Apr. 24, 2009.

(51) Int. Cl.
*G06F 17/30* (2006.01)
(52) U.S. Cl.
CPC .................. *G06F 17/30091* (2013.01)
(58) Field of Classification Search
USPC .......................................................... 707/653
See application file for complete search history.

(56) References Cited

U.S. PATENT DOCUMENTS

| | | | |
|---|---|---|---|
| 5,129,088 A | 7/1992 | Auslander et al. | |
| 6,356,863 B1 | 3/2002 | Sayle | |
| 7,076,509 B1 | 7/2006 | Chen et al. | |
| 7,080,051 B1 | 7/2006 | Crawford | |
| 7,107,385 B2 | 9/2006 | Rajan et al. | |
| 7,225,314 B1 | 5/2007 | Bonwick et al. | |
| 7,356,679 B1 | 4/2008 | Le et al. | |
| 7,401,093 B1 | 7/2008 | Hamilton et al. | |
| 7,437,530 B1 | 10/2008 | Rajan | |
| 7,526,558 B1 | 4/2009 | Pittman | |
| 7,546,307 B2 | 6/2009 | Terrell | |
| 7,584,279 B1 | 9/2009 | Chapman | |
| 7,590,807 B2 | 9/2009 | McGovern et al. | |
| 7,627,710 B1 | 12/2009 | Todd et al. | |
| 7,636,744 B1 | 12/2009 | Aggarwal et al. | |
| 7,676,760 B1 | 3/2010 | Rosenquist et al. | |
| 7,680,844 B2 | 3/2010 | Brown | |

(Continued)

FOREIGN PATENT DOCUMENTS

KR  20090030548  *  9/2007  ............. H04L 12/28

OTHER PUBLICATIONS

De Jonge et al., "The Logical Disk: A New Approach to Improving File Systems," Operating Systmes Review, 1993, vol. 27(5):15-28, 14 pages.

(Continued)

*Primary Examiner* — Amresh Singh
(74) *Attorney, Agent, or Firm* — Sheridan Ross P.C.

(57) ABSTRACT

A system is provided for migrating, in an automated way, old backups created using older software to the current vendor. Generally, backup products are composed of a few broad sub-systems. The migration system organizes old backup data and can present the backup data to a new vendor's system. The embodiments include a virtual appliance, which can include a client (e.g., a consumer of the XBSA API) to drive the legacy vendor with user selections to pull data from existing media and create a server personality that can be presented to the new backup software. The new backup system can then use existing means to discover, backup, and catalog data made available via the virtual appliance.

20 Claims, 9 Drawing Sheets

(56) References Cited

U.S. PATENT DOCUMENTS

| | | |
|---|---|---|
| 7,685,126 B2 | 3/2010 | Patel et al. |
| 7,743,033 B2 | 6/2010 | Patel et al. |
| 7,783,611 B1 | 8/2010 | Hamilton et al. |
| 7,809,883 B1 | 10/2010 | Fair et al. |
| 7,810,092 B1 | 10/2010 | van Rietschote et al. |
| 7,937,453 B1 | 5/2011 | Hayden et al. |
| 7,945,726 B2 | 5/2011 | Faibish et al. |
| 8,117,168 B1 | 2/2012 | Stringham |
| 8,190,850 B1 | 5/2012 | Davenport et al. |
| 8,335,765 B2 | 12/2012 | Sivasubramanian et al. |
| 8,407,448 B1 | 3/2013 | Hayden et al. |
| 8,429,242 B1 | 4/2013 | Todd |
| 8,468,455 B2 | 6/2013 | Jorgensen et al. |
| 8,725,967 B2 | 5/2014 | DeSantis et al. |
| 8,903,772 B1 | 12/2014 | Hayden |
| 8,918,488 B2 | 12/2014 | Umbehocker |
| 2002/0049778 A1 | 4/2002 | Bell et al. |
| 2002/0059623 A1 | 5/2002 | Rodriguez et al. |
| 2002/0133491 A1 | 9/2002 | Sim et al. |
| 2003/0101239 A1 | 5/2003 | Ishizaki |
| 2003/0110351 A1 | 6/2003 | Blood et al. |
| 2004/0030822 A1 | 2/2004 | Rajan et al. |
| 2004/0225837 A1 | 11/2004 | Lewis |
| 2005/0091266 A1 | 4/2005 | Hasegawa |
| 2005/0154825 A1 | 7/2005 | Fair |
| 2005/0234846 A1 | 10/2005 | Davidson et al. |
| 2005/0273486 A1 | 12/2005 | Keith |
| 2005/0289218 A1 | 12/2005 | Rothman et al. |
| 2006/0129558 A1 | 6/2006 | Brown et al. |
| 2006/0200477 A1* | 9/2006 | Barrenechea ................. 707/100 |
| 2006/0230076 A1 | 10/2006 | Gounares et al. |
| 2006/0248047 A1 | 11/2006 | Grier et al. |
| 2007/0282969 A1 | 12/2007 | Dietrich et al. |
| 2007/0288534 A1* | 12/2007 | Zak et al. .................... 707/204 |
| 2008/0072000 A1 | 3/2008 | Osaki et al. |
| 2008/0104144 A1 | 5/2008 | Rajan |
| 2008/0250222 A1 | 10/2008 | Gokhale et al. |
| 2008/0275924 A1* | 11/2008 | Fries ............................ 707/204 |
| 2008/0275925 A1 | 11/2008 | Kimmel |
| 2008/0294704 A1 | 11/2008 | Akagawa et al. |
| 2008/0320097 A1 | 12/2008 | Sawicki et al. |
| 2009/0024752 A1 | 1/2009 | Shitomi |
| 2009/0157942 A1 | 6/2009 | Kulkarni |
| 2009/0171993 A1 | 7/2009 | Arthursson |
| 2009/0216816 A1 | 8/2009 | Basler et al. |
| 2009/0276771 A1 | 11/2009 | Nickolov et al. |
| 2010/0076936 A1 | 3/2010 | Rajan |
| 2010/0088328 A1 | 4/2010 | Joshi et al. |
| 2010/0149572 A1 | 6/2010 | St. Jacques, Jr. et al. |
| 2010/0198972 A1 | 8/2010 | Umbehocker |
| 2010/0274772 A1* | 10/2010 | Samuels ....................... 707/693 |
| 2010/0274784 A1 | 10/2010 | Acharya |
| 2010/0299512 A1 | 11/2010 | Maruyama et al. |
| 2010/0332617 A1 | 12/2010 | Goodwin et al. |
| 2011/0066668 A1 | 3/2011 | Guarraci |
| 2011/0107052 A1 | 5/2011 | Narayanasamy |
| 2013/0185723 A1 | 7/2013 | Joshi et al. |

OTHER PUBLICATIONS

Fei et al., "Research of the File System of Volume Holographic storage Based on Virtual Storage Layer," Practical Holography XXII: Materials and Applications, Proc. of SPIE, 2008, vol. 6912, 69120G, 9 pages.

"How Virtual Disk Service Works," Microsoft Library, Mar. 28, 2003, retrieved from https://technet.microsoft.com/en-us/library/cc739923(d=printer,v=ws.10).aspx, 5 pages.

Jo et al., "SSD-HDD-Hybrid Virtual Disk in Consolidated Environments*," Euro-Par 2009 Workshops, LNCS 6043, pp. 375-384.

Pfaff et al., "Virtualization Aware File Systems: Getting Beyond the Limitations of Virtual Disks," NSDI '06: 3rd Symposium on Networked Systems Design & lmplementaion, USENIX Assoc., 2006, pp. 353-366.

Qiao et al., "PULSTORE*: Automated Storage Management with QoS Guarantee in Large-scale Virtualized Storage Systems," Proc. 2nd Int'l Conf. on Autonomic Computing (ICAC '05), 2005, 2 pages.

Xiao et al., "Flexible Metadata Management for Block-level Storage System," Proc. 7th ACIS Int'l Conf. on Software Engineering, Artificial Intelligence, Networking, and Parallel/Distributed Computing (SNPD '06), 2006, 6 pages.

Yi et al., "The file system research based on the volume holographic data storage," 7th Int'l Symposium on Optical Storage, Proc. SPIE, 2005, vol. 5966, 6 pages.

Official Action for U.S. Appl. No. 12/766,778, dated Mar. 19, 2012, 21 pages.

Final Action for U.S. Appl. No. 12/766,778, dated Sep. 28, 2012, 20 pages.

Official Action for U.S. Appl. No. 12/766,778, dated Jan. 7, 2014, 23 pages.

Official Action for U.S. Appl. No. 12/766,778, dated Jul. 15, 2014, 27 pages.

Notice of Allowance for U.S. Appl. No. 12/766,778, dated Mar. 16, 2015, 18 pages.

* cited by examiner

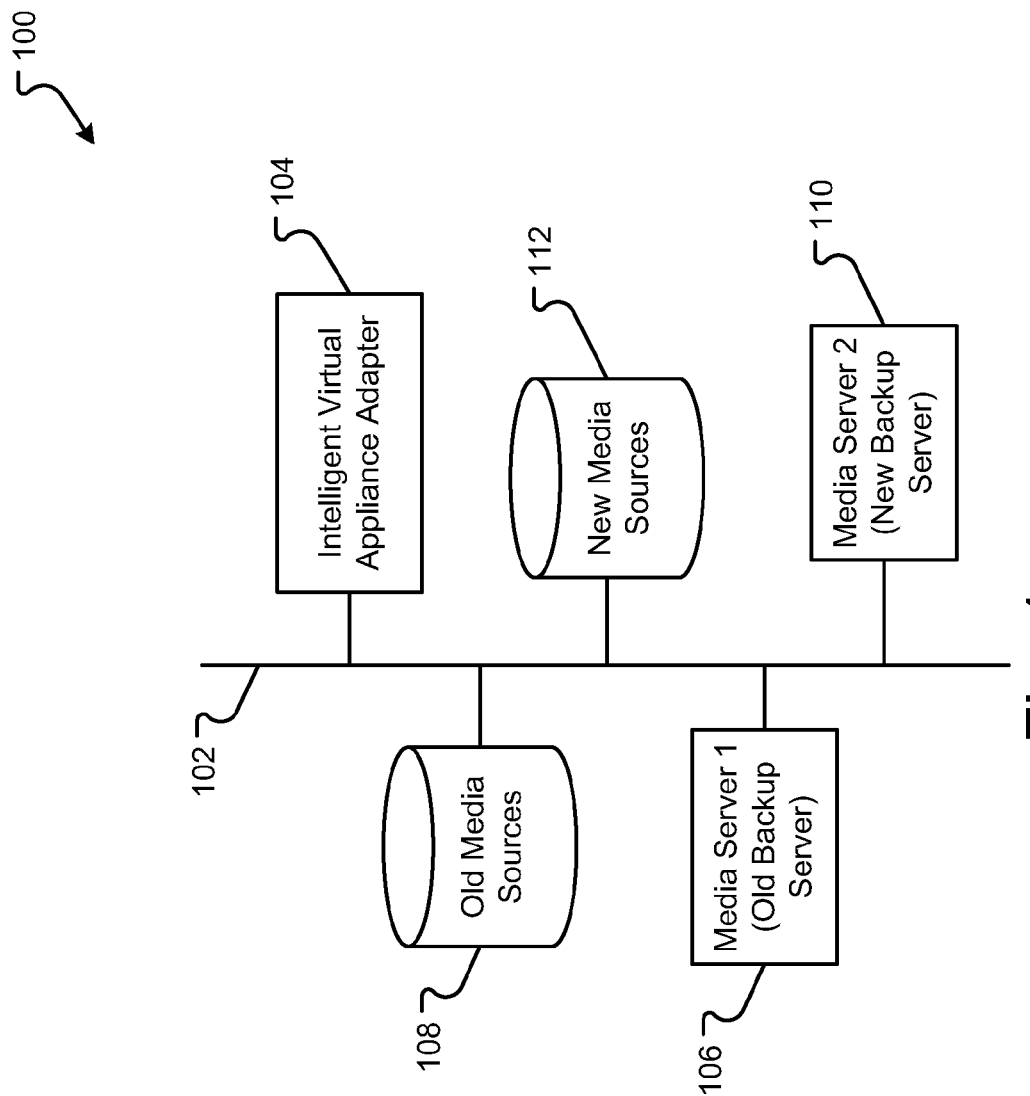

BACKUP MEDIA CONVERSION VIA INTELLIGENT VIRTUAL APPLIANCE ADAPTER

CROSS REFERENCE TO RELATED DOCUMENTS

This application is a continuation-in-part application from U.S. patent application Ser. No. 12/766,778, filed Apr. 23, 2010, entitled "VIRTUAL DISK FROM NETWORK SHARES AND FILE SERVERS," which is a non-provisional application of and claims priority to U.S. Provisional Patent Application No. 61/172,218, filed Apr. 24, 2009, entitled "VIRTUAL DISKS AND BOOTABLE VIRTUAL DISKS FROM NETWORK SHARES AND FILE SERVERS"; U.S. Provisional Patent Application No. 61/176,098, filed May 6, 2009, entitled "CLOUDSAFE—MULTI-FUNCTION CLOUD STORAGE AND ON-DEMAND WORKPLACE GATEWAY"; and U.S. Provisional Patent Application No. 61/218,419, filed Jun. 19, 2009, entitled "BACKUP MEDIA CONVERSION VIA INTELLIGENT VIRTUAL APPLIANCE ADAPTER." All of these patent applications cited above are incorporated by reference herein in their entirety for all that the patent applications teach.

BACKGROUND

Backup is a necessary practice in all companies. The data backup market is lucrative and has attracted many vendors. Each vendor competes with the other vendors to switch customers to their backup systems by promising reliability, features, and ease-of-use. Data backup lends itself to continuous improvement and opportunity for new vendors. Unfortunately, problems arise once customers decide to switch backup systems. Regulatory or compliance reasons force customers to retain old backups (created with the previous vendor's systems) for a period of years. Although customers retain the right to use the old software and use it to restore old backups when called upon, this decision increases the cost of having to maintain the old vendor's system and retain skills associated with the old system. Further, the customer must manage the complexity of using two or more vendor systems, thus limiting operational streamlining that would result from employing a single vendor solution. Currently, there is no good way of integrating backup systems.

SUMMARY

It is with respect to the above issues and other problems that the embodiments presented herein were contemplated. The solution to the above problems is to provide a means of migrating, in an automated way, old backups created using older software to the current vendor. This solution would allow customers to transition easily from one vendor to the other as technologies change occurs. Further, the solution allows for multiple changes and can perform de facto backup verification. Generally, backup products are composed of a few broad sub-systems. Products often have a database which catalogs all backups for search and restore. In addition, there are agents that can be installed on every protected node; the agents can coordinate backup and recovery. Further, there can be specialized software, which may reside on media server nodes and coordinate media (e.g., disk, tape, robotics, etc.) access. Many vendors subscribe to a standard called XBSA—X/Open Backup Services application programming interface (API), which offers a portable way to interact with enterprise backup vendors. The XBSA architecture is as described in Systems Management: Backup Services API (XBSA) Document Number: C425 ISBN: 1-85912-056-3, which is incorporated herein by reference in its entirety for all that it teaches.

Embodiments of systems and methods described herein provide a migration system that organizes old backup data and can present the backup data to a new vendor's system. The embodiments include a virtual appliance, which can include a client (e.g., a consumer of the XBSA API) to drive the legacy vendor with user selections to pull data from existing media and create a server personality that can be presented to the new backup software. The new backup system can then use existing means to discover, backup, and catalog data made available via the virtual appliance.

In the backup process, the virtual appliance, in a presentation layer, can automatically discover all servers in an environment and present, via a user interface, a list of nodes that are sources for backup migration. This discovery process can be accomplished by sweeping for addresses of all servers in the environment and then, for each server, using the XBSA query interface to determine if any of the servers have legitimate backup objects that exist on associated media. If the discovered servers do have backup objects, these objects may then be presented via a user interface (UI) as a set of servers that may be selected for backup conversion.

For each server determined by the discovery process, the virtual appliance can discover backup objects using, for example, BSAQueryObject( ) to query for the objects cataloged under the discovered server. These discovered objects can be presented to a user to select relevant backup objects for migration. The address obtained during the discovery process may need to be requested from a domain name server (DNS) so that canonical names can be used for Internet addresses.

In embodiments, the BSAQueryObject( ) function call semantics appear as follows:
  int BSAQueryObject(long bsaHandle, BSA_QueryDescriptor *queryDescriptorPtr, BSA_ObjectDescriptor *objectDescriptorPtr)

An object descriptor, corresponding to a predetermined server, can be returned by BSA_ObjectDescriptor (referenced by the BSA_ObjectDescriptorPtr parameter). Calling BSAGetNextQueryObject( ) continues until the object namespace returns all objects cataloged under the given server and is exhausted.

For the small number of backup vendors which do not support the XBSA interface, an appropriate vendor command line tool may be used to deliver the same results of discovering all cataloged objects under a given server.

Once this object information is obtained and presented to the user on a UI, the user can proceed to make a selection(s) of objects that are candidates for conversion to media written and controlled by the new vendor. Often, the latest (newest backed up data) is desired but a time range may also be specified to eliminate older backed up objects.

In embodiments, this conversion functionality is embedded in a Linux virtual machine (any appropriate Operating System may be used to implement equivalent functionality). The Linux virtual machine also requires installation of the new vendor's client agent. Once the vendors' agent is installed and the Linux virtual machine is added to the vendor's central database, the virtual machine can become a full-fledged candidate for backup by the new vendor's system.

A mount-point (i.e., a local directory that can act as a backup root for the legacy data) may be presented to the new backup vendor software. This mount-point directory can become the target for backup for the new vendor. Legacy data may be presented to the new backup vendor under this directory (mount-point) as the vendor agent reads the data.

The legacy data can be presented to the new vendor system under the directory or mount-point, with associated sub-directories presented underneath the main directory. In embodiments, each discovered server can be represented under the main directory by the server's canonical name. After the user selection takes place, a preparation process may start, which fills in all canonical names from the user selections, as well as sub-directories underneath the selections, which maps to objects discovered via the BSAQueryObject process described above. This discovery process automatically initiates media preparation and requisite pre-fetch work required to seed these directories. No actual object data is pulled at this stage.

/legacy/server1/dir1/dir2/file1
dir3/dir1/file2
dir1/dir2/dir7/file1
server2/C:/Windows/file1
D:/DATA/user1/file2
server3 . . .

A backup-conversion module may be used to present these virtual directories representing legacy data to the new vendor client agent. The conversion module can be located under the vfs/vnode layer and intercepts calls that access file objects under the backup mount-point.

The backup conversion module is presented the entire user selection after normalization. Normalization involves using the user selection (which may include wild cards, exclusions, inclusions, etc.), using the BSAQueryObject( ) interface, to pull the set of names and then applying inclusions, exclusions, etc. to generate a fully qualified name set. The conversion module uses this information, usually supplied inside a file, to generate a list of directories underneath the mount point. It reads each line in the input file entry and creates a directory entry for it.

As the backup agent makes a pass through all the entries, the backup agent sees the entire directory hierarchy that it needs to backup and uses normal techniques to start the backup process. As leaf entries in this hierarchy are opened, i.e. files are opened, the backup-conversion module makes a corresponding BSAGetObject( ) call to obtain a handle to the legacy data object. As the backup agent proceeds to make read system calls the backup-conversion module makes a corresponding BSAGetData( ) call to obtain data from the legacy vendor's media via the XBSA interface. There does not need to one-to-one correspondence, the backup-conversion module can read ahead and buffer data. Multiple files can be read at once to speed up this process. On a corresponding close file system call, BSAEndData( ) is called to de-commit XBSA resources. The process is not resource intensive as only a few handles stay open at a time and all data may be rapidly copied up to the user program (the backup agent).

The virtual appliance can be configured with multiple network gigabit interfaces with which to pull data from the legacy source and feed data (via the backup agent) to the destination media server. The virtual machine can also be directly connected to a SAN to backup to a SAN LUN or a tape device (via a virtual SCSI interface), as per the capabilities of the backup vendor software.

The whole process proceeds like a normal backup mechanism where all data is backed up to new media controlled by the new vendor software. Each canonical server name is cataloged under the backup directory name with all directories and files cataloged under the appropriate server name. For the set of backup vendors who do not support the XBSA interface, the vendors usually offer command line tools which would serve the same purpose, i.e. be able to extract on demand data from the old media and server it up to new vendor's agent via the backup-conversion fuse module.

Another embodiment of this invention includes a virtual machine represented by many virtual IP addresses (assigned from a dynamic pool) and many canonical names which correspond to the actual server names. The backup-conversion module still can present the 'legacy' mount-point hierarchy but the requested IP address of the incoming call to the backup agent is used to present a file-system view of the canonical server name corresponding to the IP address. Thus, if a backup software connects to the virtual IP address, which corresponds to server 1, the backup software can only see server 1's original backup mount points and not the entire set of data under the legacy mount-point. This arrangement can cause the cataloging process to catalog all legacy objects under server 1 as it would have appeared under the legacy backup product. In embodiments, User Mode Linux (UML) is used in this situation. All information about User Mode Linux available at http://user-mode-linux.sourceforge.net/ and elsewhere is hereby incorporated by reference in its entirety for all that it teaches.

The "ubda=cow,root_fs" command line argument can be used to start up an UML instance tied to a canonical name/IP address to present a separate writeable root file-system that is based on the same base copy on which the backup client software is installed. The hostfs file-system is used to mount the appropriate /legacy/serverX directory inside the UML instance. The backup vendor software may be inherited via the root file-system into every UML instance and it sees a set of directories specific to the original backed up server under each UML instance.

Each UML instance has a unique IP address set up by connecting to the TAP/TUN device setup on the virtual appliance itself as per http://user-mode-linux.sourceforge.net/network.html. When a given virtual IP is connected, traffic may be directed to the right UML instance serving that IP and proxying for the equivalent legacy server data. The backup agent runs inside the UML instance unaware that it is twice virtualized and that actual data is served by the backup-conversion fuse module from remote media.

In further embodiments, instead of using a backup agent to re-backup legacy data to a new media, the conversion virtual appliance may also be exposed via NFS or CIFS, and or participate in a DFS namespace to be able to serve backup data as legitimate file access points, either as redundant DFS targets or as an automated recovery mechanism. To effect this configuration, NFS server software and/or Samba software needs to be installed alongside other software in the virtual machine. As the user selection is made, and the canonical list is generated for the backup conversion fuse module, NFS and/or CIFS shares are also automatically created, one per selected server with all directories and files visible underneath. Authentication can be manually configured or mediated through Active Directory, NIS, or OpenLDAP services. Users with proper permission can mount these network shares and recover files at will or transfer them to new location.

This technique is also valuable in situations where less frequently or lower value data has been backed up and then replaced by a stub. This situation happens when some hierarchal storage management or some policy based data migration is present in the environment. The stub is used to recall the file as needed. The stub will point to a share on the virtual appliance, which contains the object that represents the backup of the file.

The above described process which ties legacy backup software to new backup vendor software via an automated process embodied in a virtual machine can be leveraged to move data on legacy media on demand, piece-meal or in bulk. Exposing legacy backup data via standard file access protocols is also possible. Any vendor which supports the XBSA interface can be plugged in as source for conversion any vendor which has a standard file-oriented backup agent for Windows or Linux platforms qualifies.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation, or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "in communication with" as used herein refers to any coupling, connection, or interaction using electrical signals to exchange information or data, using any system, hardware, software, protocol, or format.

The term "virtual" or "virtualization" as used herein refers to a logical representation of some other component, such as a physical disk drive. In other words, the "virtual" component is not actually the same as the physical component it represents but appears to be the same to other components, hardware, software, etc. of a computer system.

The term "disk" as used herein refers to a storage disk or other memory that can store data for a computer system.

BRIEF DESCRIPTION OF THE DRAWINGS

The present disclosure is described in conjunction with the appended figures:

FIG. 1 is a block diagram of an embodiment of a system operable to backup data;

Figure 2A:
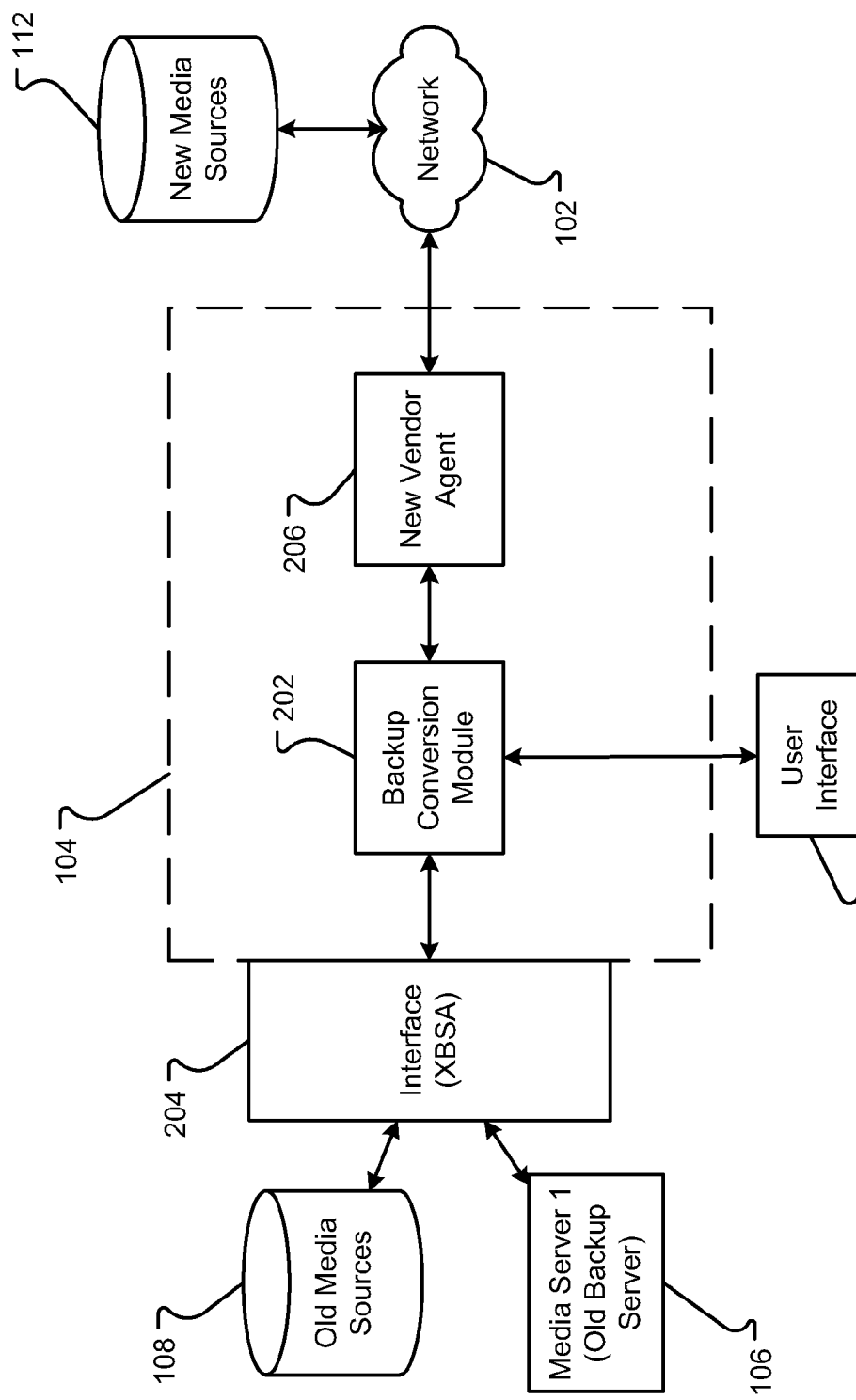
FIG. 2A is a block diagram of an embodiment of a virtual machine operable to convert backup data.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the invention. Rather, the ensuing description will provide those skilled in the art with an enabling description for implementing the embodiments. It should be understood that various changes may be made in the function and arrangement of elements without departing from the spirit and scope of the appended claims.

An embodiment of a media backup system 100 is shown in FIG. 1. The backup system 100 can include one or more components that can be computer systems, as described in conjunction with FIGS. 7 and 8. Thus, each component may include a processor and memory operable to execute computer executable instructions that cause the processor to execute functions or methods as described herein. Each component can be operable to execute software or, in other embodiments, be a component of dedicated hardware, for example, an application specific integrated circuit (ASIC) or a field programmable gate array (FPGA).

The system 100 can include a network 102, an intelligent virtual appliance adaptor 104, at least one source of old media or legacy backed-up media 108, at least one source for new media that will be backed-up 112, at least one media server 106 that stores old or legacy backup data 106, and/or at least one media server 110 that will store the newly backed-up data 110. In embodiments, the old backup sources 108 may be the same or similar to the new media backup sources 112. Further, the old backup server 106 may be a software application that executes on the same hardware as the new backup server 110. In other alternative embodiments, the new backup server 110 may execute inside the intelligent virtual appliance adaptor 104, as a software system. The components of the system 100 can communicate with each other through the network 102. The network 102 can be a local area network (LAN), a wide area network (WAN), or other network as understood in the art.

An embodiment of an intelligent virtual appliance adaptor 104 is shown in FIG. 2A. The intelligent virtual appliance adaptor 104 can be in communication with the network 102, the new media sources 112, the second media server 110 (not shown), the old media sources 108, and the first media server 106. Further, in embodiments, the intelligent virtual appliance adaptor 104 can include an interface that sends or receives signals from a user interface 208 that can communicate with the user. The intelligent virtual appliance adaptor 104 can include a backup conversion module 202 that is operable to virtualize old backed-up media and present that virtualized backed-up media to the new vendor agent for storage as backup data in the new vendor system.

The new vendor agent 206 can be a software component of the media server 110 or can embody the media server 110. As such, the new vendor agent 206 can store data from the enterprise as backup data in a new system. The new vendor agent 206 can be installed in the intelligent virtual appliance adaptor 104 by storing computer executable instructions in memory and having the processor of the intelligent virtual appliance adaptor 104 execute the new vendor agent 206. The backup conversion module 202 then becomes a new source for the new vendor agent 206 to store backup data through the network into new media sources 112.

The backup conversion module 202 can also communicate with an interface, which may be an application programming interface (API), which interfaces with the old backup server 106 and old media sources 108. In embodiments, the interface 204 is the X/open backup services (XBSA) API which is commonly used as an interface to backup services. The XBSA interface is described in systems management: backup services API (XBSA) document number: C425 ISBN 1-85912-056-3, which is incorporated herein by reference in its entirety for all it teaches. The backup conversion module 202 becomes a client of the XBSA interface and sends commands to the XBSA interface to both discover and read data from the old or legacy backup server 106 and old media sources 108 to provide a virtualized directory to the new vendor agent 206 and the old data to the new vendor agent 206. An embodiment of the backup conversion module 202 is described in conjunction with FIG. 2B.

Figure 2B:
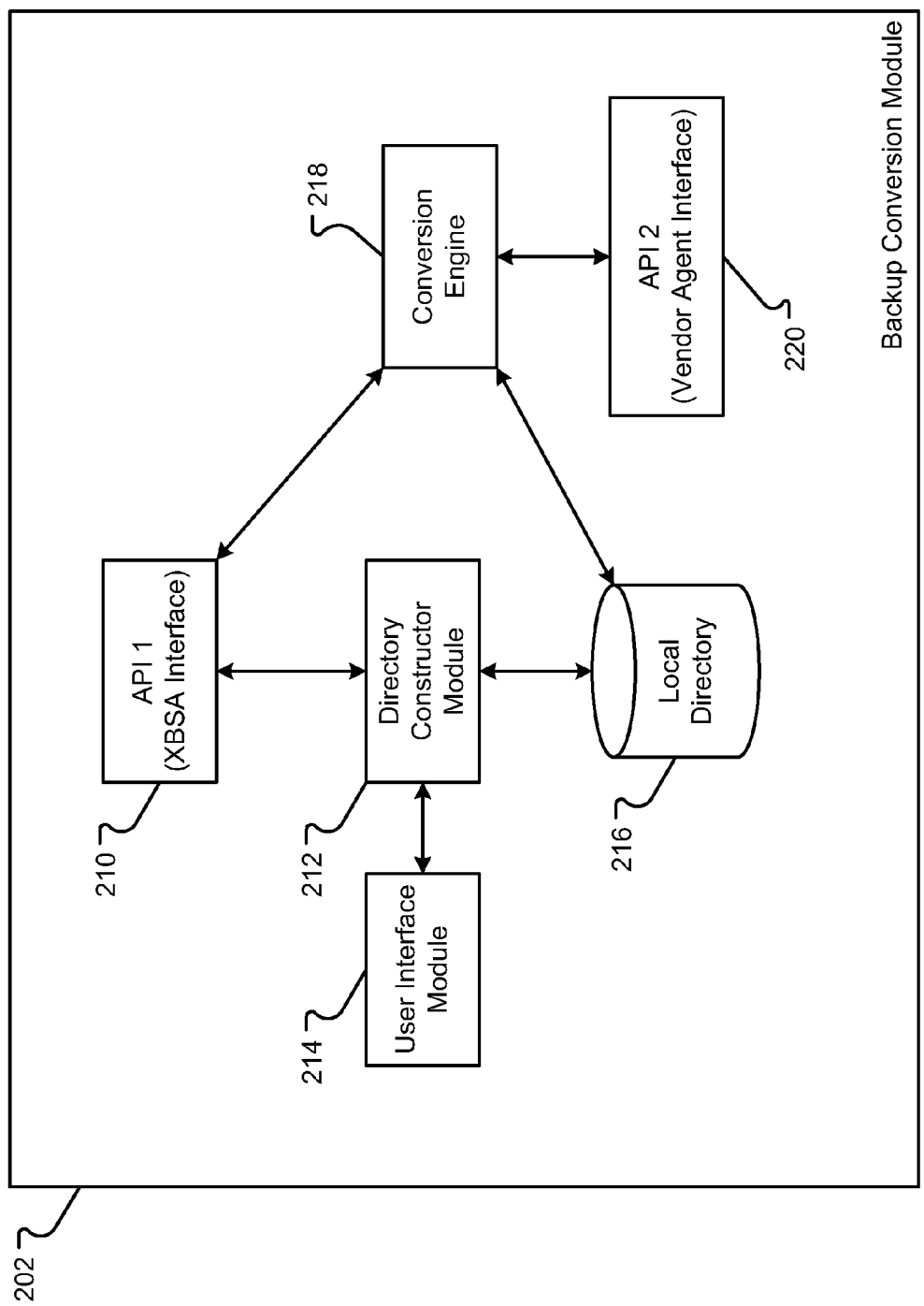
FIG. 2B is a block diagram of an embodiment of the backup conversion module operable to convert the backup data.

An embodiment of a backup conversion module 202 is shown in FIG. 2B. The backup conversion module 202 can include one or more other components which may be software executable instructions embodying modules of software that perform different functions. In embodiments, the backup conversion module 202 can include a directory constructor module 212 and a conversion engine 218. The directory constructor module 212 can communicate with a first API 210 which may communicate with the XBSA interface 204. Further, the directory constructor module 212 may communicate with a user interface module 214, which may communicate with a user interface 208.

The directory constructor module 212 is operable to sweep through or traverse the different enterprise backup media 108 or backup servers 106 through the API 210 to discover old backup data. This old backup data is constructed into a virtual file system that may be then presented to the new vendor agent 206 through the conversion engine 218. In embodiments, the directory constructor module 212 may use and instruct the XBSA interface 210. Thus, a BSAQueryObject( ) function that will read or find backup objects within the enterprise system that can include backup data. Each one of the different directories may form branches and the objects may become leaves in the virtualized directory structure, as explained in conjunction with FIG. 3.

This directory structure and objects that are exposed by the directory constructor module 212 and may be presented through the user interface module 214 to user interface 208. The user may then be able to determine which of the exposed objects to backup into the new backup software. The selections are received through the user interface 208 and sent to the user interface module 214. The user interface module 214 may then present these to the directory constructor module 212, which may then eliminate one or more objects from the exposed file system such that those eliminated objects will not be backed up into the new system.

The virtualized file system of backed up objects may then be provided to the conversion engine 218. Further, the virtualized file system or exposed directory can be stored in the local directory 216, which may include a memory that stores the virtualized file system and may also operate as a cache. This local directory 216 may be read by the conversion engine 218. The local directory 216 can be any memory or storage described in conjunction with FIGS. 7 and 8.

The conversion engine 218 may also communicate with the XBSA interface 210 and the local directory 216. Further, the conversion engine 218 may be operable to communicate with the second application programming interface 220 that may act as an interface to the new vendor agent 220. Thus, the new backup server 110 can communicate as the new vendor agent 206 or through the new vendor agent 206 through the API 220 to the backup conversion module 202. The conversion engine 218 can also be operable to receive read requests, which are directed to the virtualized file system stored in the local directory 216, that provide information about the directory or to intercept commands directed to the old backup data and reroute those read requests to the local directory 216. Further, the conversion engine 218 may be operable to receive or intercept read commands directed to copying the old media from the old media sources 108 or from the old backup server 106. These intercepted read commands are rerouted through the XBSA interface 210 to obtain old data and provide the old data to the API 220 for the new vendor agent 206. The interceptions function so that the new vendor agent 206 believes that the data from the virtualized file system in a local directory 216 is actually from the actual backup server 106.

The interfaces 210, 214, and/or 220 are operable to communicate with the different components in protocols or formats specific to those other components 204, 208, and/or 206. Thus, the interfaces 210, 214, and/or 220 are operable to make translations or convert data as necessary to allow the backup conversion module 218 to communicate with the different components 204, 208, and/or 206. In embodiments, the backup conversion module 202 is a Linux virtual machine or other virtual machine that operates with an operating system. The virtual machine may require the installation of the new vendor agent 206 to become a full fledged candidate for backup of data. A mount point may be presented to the new vendor agent 206 to become a target for backup. The legacy or old backup data is presented to the new vendor agent 206 under this mount point, or as a directory, as the new vendor agent 206 reads the data.

Figure 3:
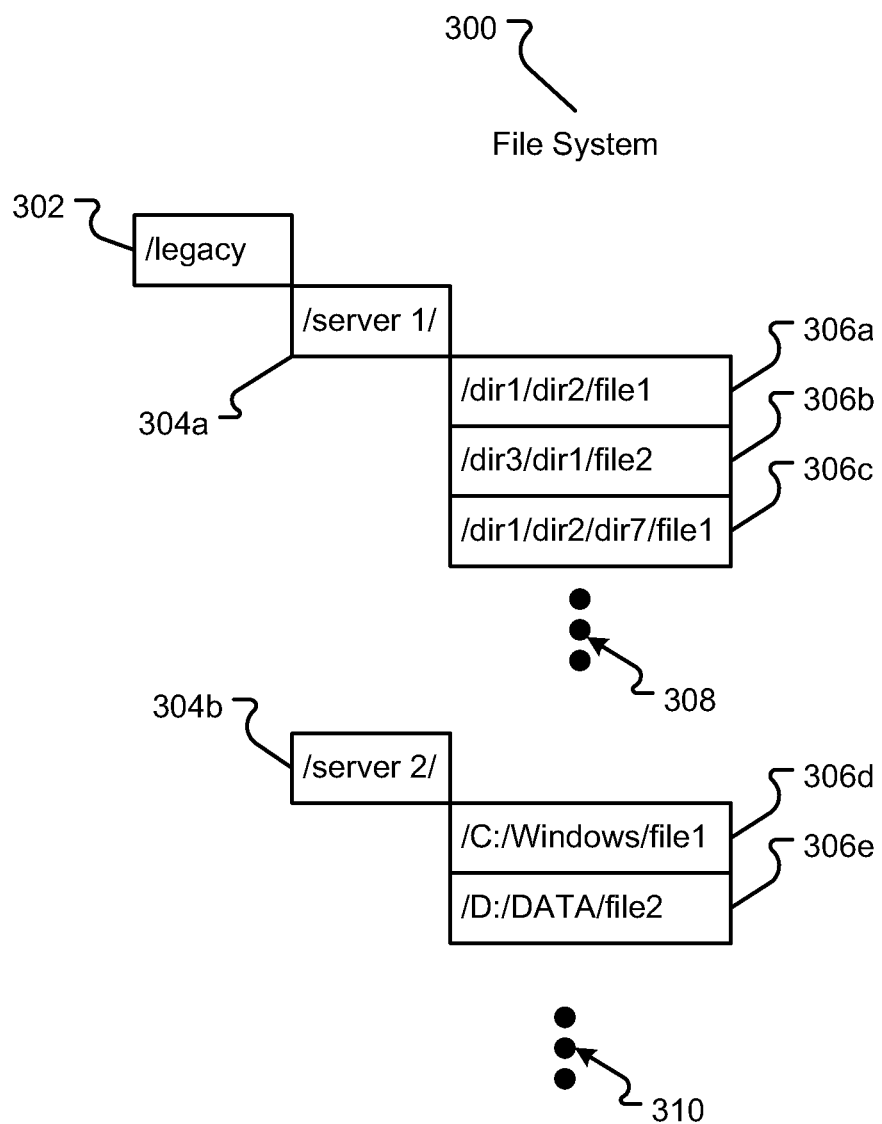
FIG. 3 is a block diagram of embodiment of a virtual file system data structure.

An embodiment of the virtualized directory 300, as created by the directory constructor module 212 and presented to the new vendor agent 206, is shown in FIG. 3. The virtualized directory 300 can be stored in the local directory 216 as legacy data under a legacy root directory 302. The legacy root directory 302 can then include one or more server nodes 304a, 304b, etc., that include files stored under a specific directory structure shown as 306a through 306e. There may be more or fewer files and servers as represented by ellipses 308 and 310. The file system 300 is a virtualized directory as there is no actual data stored in the local directory 216 but rather the file names are placeholders to be presented to the new vendor agent 206. All metadata and other information required by the new vendor agent may be stored in the directory server 300 and presented to the new vendor agent 206. However, in other embodiments, there may be only a pointer stored within the file system under the leaves or nodes for the files 306a through 306e that may then point to the location of the backup data within the backup server 106 or old media sources 108. The servers 304 and files 306, within the directories, may provide canonical names to the new vendor agent 206 such that when a BSAQueryObject( ) function or other query is executed, the canonical name is provided to the new vendor agent 206 rather than the actual file structure address in the virtualized directory.

The kernel in the intelligent virtual appliance adaptor 104 may execute a file system component that can make a directory appear as several servers with canonical names. For example, the intelligent virtual appliance adaptor 104 may execute the File System in User Space (FUSE) software component in the kernel to provide an interface to a virtual file system. The FUSE module can communicate with the conversion module through the API 220. The FUSE module can provide a bridge between the virtualized file system 300 and the canonical name, such that, the new vendor agent 206 appears to be reading data from one or more servers but actually receives data from other sources.

In embodiments, at start up, a UML instance is created to tie the canonical names and IP addresses to present the file system 300 as an entire virtual server end-point. The host file system on the virtual appliance is then used to mount the file system 300 inside the UML instance. The characteristics of the backup vendor software is inherited as part of the host file system into the UML instance such that the new vendor agent 206 sees a set of directories that appears as part of the original back-up embodied by the UML instance. Each unique IP address for the virtualized backup servers is connected as a separate TAP/TUN device set up within the virtual appliance. When read or other requests are received for the virtual IP address, the command is directed to the correct UML instance that serves as the proxy for that IP address. Thus, the new vendor agent 206 can run inside the UML instance and be unaware of the fact that it is not really an isolated server instance and that the data is actually being provided by the FUSE module that interfaces with the old media server 106 or media sources 108.

Figure 4:
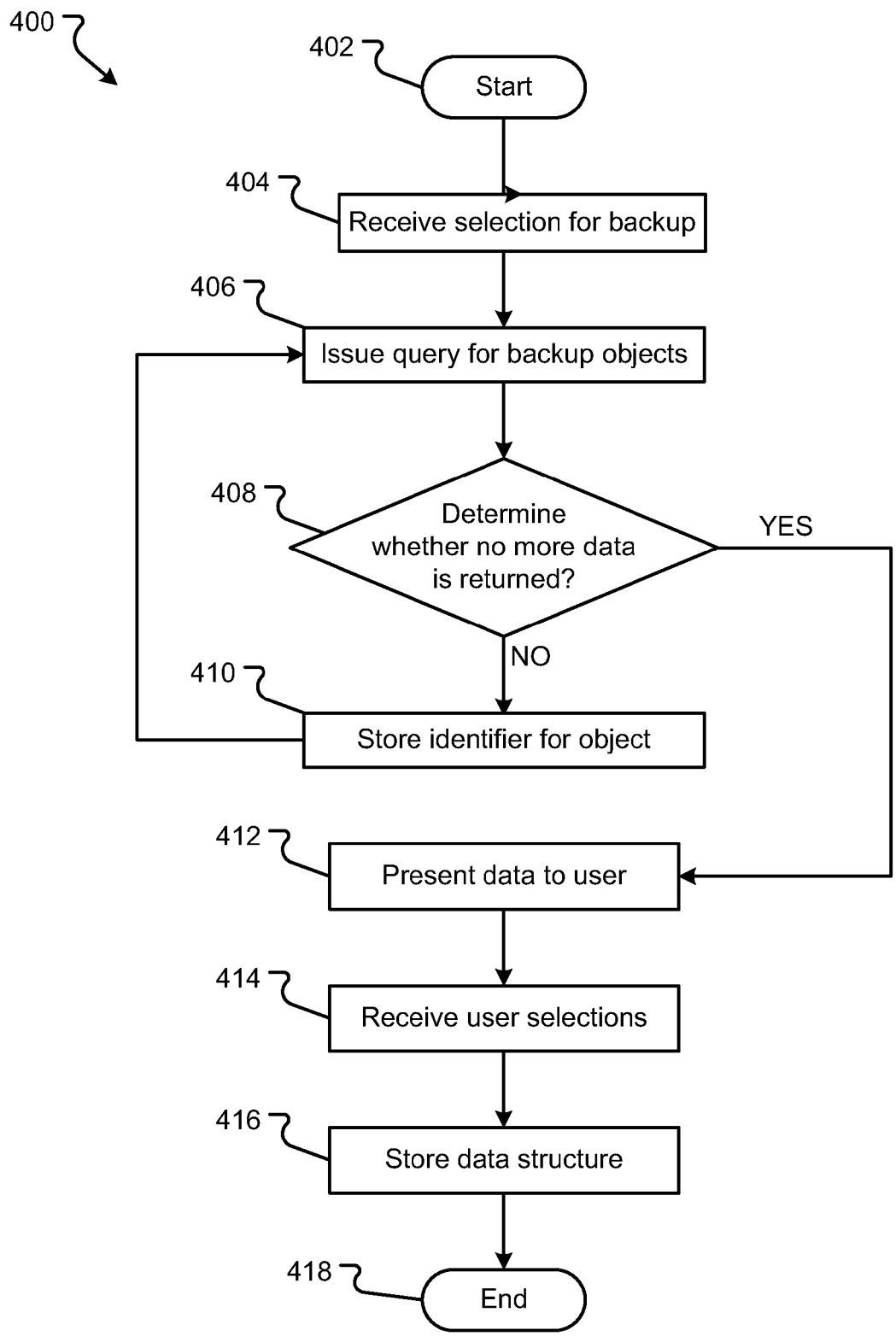
FIG. 4 is a flow diagram of an embodiment of a process for creating a virtual file system data structure.

An embodiment of a process or method 400 for creating a virtualized file system 300 is shown in FIG. 4. Generally, the method 400 begins with a start operation 402 and terminates with an end operation 418. While a general order for the steps of the method 400 are shown in FIG. 4, the method 400 can include more or fewer steps or arrange the order of the steps differently than those shown in FIG. 4. The method 400 can be executed as a set of computer-executable instructions executed by a computer system and encoded or stored on a computer readable medium. Hereinafter, the method 400 shall be explained with reference to the systems, components, modules, software, data structures, etc. described in conjunction with FIGS. 1-3.

A selection for backup is received, in step 404. The selection may be a user directive sent from a user interface 208 to the user interface module 214 of the virtual appliance 104. The directive can also be a request for backup data from a new vendor agent 206 installed in the virtual application 104. The directive begins the process of cataloging backup object to be converted to the new vendor system. In the backup process, the virtual appliance, in a presentation layer, can automatically discover all servers in an environment and present, via a user interface, a list of nodes that are sources for backup migration.

A query for backup object can be issued, in step 406. In embodiments, the directory constructor module 212 begins sweeping for addresses of all servers in the environment and then for each server. In embodiments, the directory constructor module 212 issues a query through the API 210 to the XBSA interface 204. It should be noted that some legacy backup vendors do not use the XBSA interface. However, these vendors generally include commands similar to those provided with the XBSA interface. An API 210 can be coded to use these commands similarly to the XBSA process described hereinafter. Thus, for the small number of backup vendors which do not support the XBSA interface, an appropriate vendor command line tool may be used to deliver the same results of discovering all cataloged objects under a given server. Therefore, one skilled in the art can conduct the method with any type of legacy vendor system.

The XBSA interface can determine if any of the media servers 106 and/or media sources 108 include backup objects that may be converted. The virtual appliance 104 can discover backup objects using, for example, BSAQueryObject( ) to query for the objects cataloged under the media servers 106 and/or media sources 108. In embodiments, the address for the objects, servers, directories, etc. may be obtained during the discovery via a domain name server (DNS) query so that canonical names can be used for the received Internet addresses.

In embodiments, the BSAQueryObject( ) function call semantics appear as follows:
    int BSAQueryObject(long bsaHandle, BSA_QueryDescriptor *queryDescriptorPtr, BSA_ObjectDescriptor *objectDescriptorPtr)

An object descriptor, for the media servers 106 and/or media sources 108, can be returned by BSA_ObjectDescriptor (referenced by the BSA_ObjectDescriptorPtr parameter). Calling BSAGetNextQueryObject( ) continues until the object namespace returns all objects cataloged under the given media servers 106 and/or media sources 108 are returned. If the discovered media servers 106 and/or media sources 108 do include backup objects, the discovered backup objects may be presented to the user interface 208 through the user interface module 214. The discovered objects can be presented to a user to select relevant backup objects for migration.

The directory constructor module 212 can then determine whether no more data is to be returned, in step 408. As the objects are queried, the query functions will eventually return a response the no more data is available. When all threads return this response, the directory constructor module 212 determines that there is no more data to be queried, and step 408 proceeds YES to step 412. However, if there is more data, the XBSA interface 204 calls the BSAGetNextQueryObject( ) function to continue the query. Thus, step 408 proceeds NO to step 410, where the directory constructor module 212 can store the identifier information returned by the XBSA interface 410. The method 400 then flows back to 406 to query the next object with the BSAGetNextQueryObject( ) function.

Once at least some of the object information is obtained, the object data can be presented to the user, in step 412. Here, the directory constructor module 212 presents the returned object data through a user interface module 214 to a user interface 208. The presentation may be in a window or other display. The presented data allows the user to select what objects should be backed up or converted to the new vendor system. The user interface module 214 may receive user selections of objects, in step 414. The selections can be made by the user discretely selecting separate objects. However, in embodiments, metadata about the discovered objects can be presented to the user with the object. The metadata can allow the user to make strings that operate to select several objects. For example, the user can select all objects in certain date ranges, certain types of data, data stored in or from certain sources, or with other information. Further, the user may use a combination of information in a search or selection system to select sets of objects.

Upon receiving the selections, the directory constructor module 212 can create the virtualized file system 300. The virtualized file system 300 may then be stored by the directory constructor module 212, in step 416. Thus, the directory constructor module 212 can store the selected objects, organized as a directory to be presented to the new vendor system 206, or information about the objects into the local directory 216. From the information stored in the local directory 216, a mount-point (i.e., a local directory that can act as a backup root for the legacy data) may be presented to the new vendor agent 206. This mount-point directory can become the target for backup for the new vendor agent 206. Legacy data may be presented to the new vendor agent 206 under this directory (mount-point) as the new vendor agent 206 reads the data.

This discovery process automatically initiates media preparation and pre-fetch work required to seed the virtual directories. In embodiments, no actual object data is yet retrieved. Rather, the virtual directory 300 is created for presentation to the new vendor agent 206.

Figure 5:
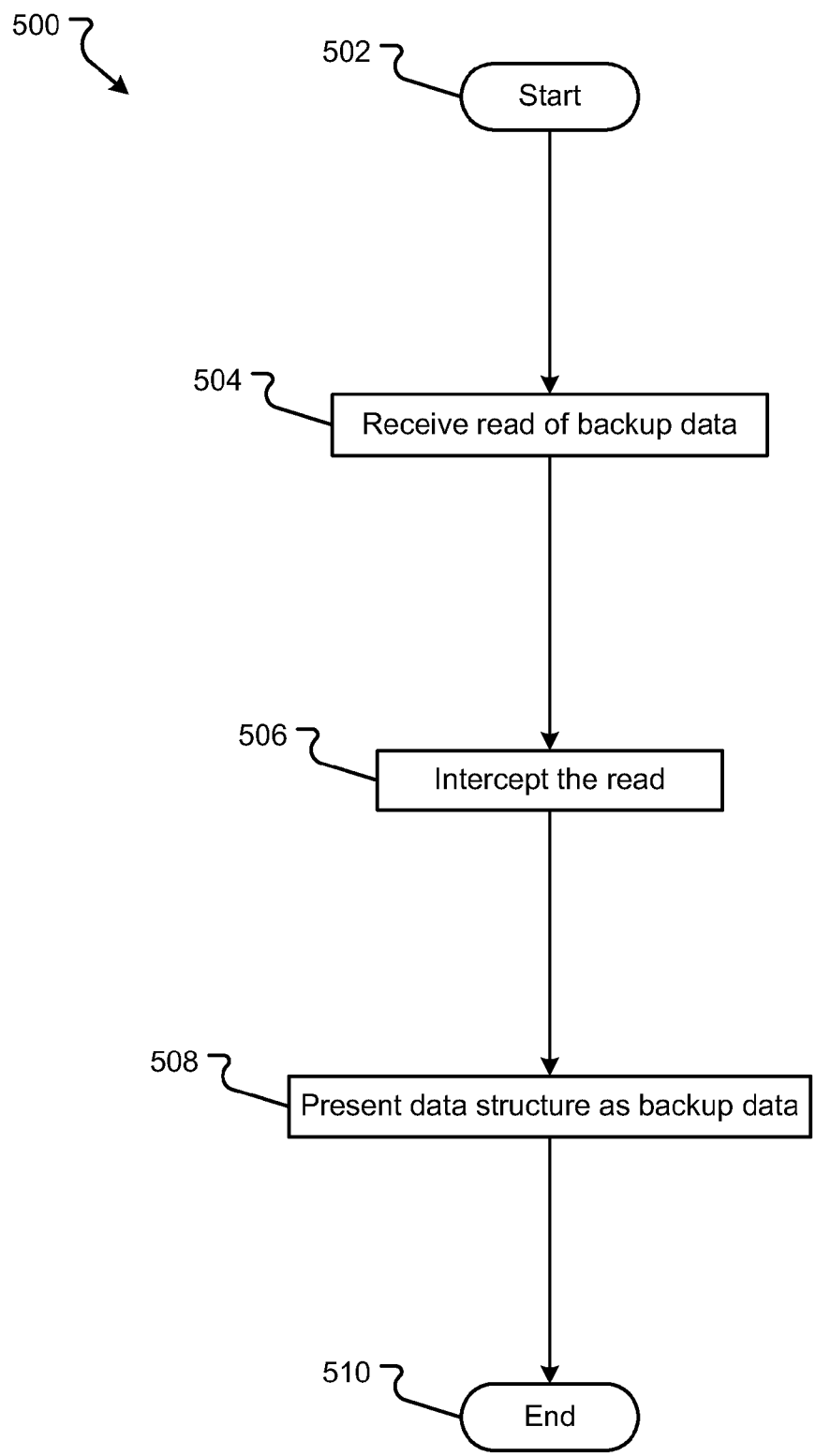
FIG. 5 is a flow diagram of an embodiment a process for presenting the virtual file system data structure for converting backup data.

An embodiment of a process or method 500 for presenting the virtual file system 300 to a new vendor agent 206 is shown in FIG. 5. Generally, the method 500 begins with a start operation 502 and terminates with an end operation 510. While a general order for the steps of the method 500 are shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, software, data structures, etc. described in conjunction with FIGS. 1-3.

The legacy data can be presented to the new vendor agent 206 under the directory or mount-point described above. The legacy data can be presented with sub-directories presented underneath a main directory. In embodiments, each discovered server can be represented under the main directory by the server's canonical name rather than an IP address.

The conversion engine 218 of the backup conversion module 202 may receive a read request from a new vendor agent 206 through the API 220, in step 504. In embodiments, a FUSE module can be located under the vfs/vnode layer to intercept the read request, in step 506. The FUSE module can intercept reads directed at objects in the virtual file system 300 to be directed to the conversion engine 218.

In embodiments, the new vendor agent 206 or user may present the request for objects using a string. Thus, the new vendor agent 206 selection may need to be normalized. Normalization involves using the selection (which may include wild cards, exclusions, inclusions, etc.), to pull the set of names and then applying inclusions, exclusions, etc. to generate a fully qualified name set. The backup conversion module 220 can use the normalized information, usually supplied inside a file, to generate a list of directories underneath the mount point of the virtual file system 300. In embodiments, the backup conversion module 220 reads each line of the read request, accesses the virtual file system 300 in the local directory 216 to create a directory entry for the line of the read request.

Thus, the backup conversion module 220 can present the virtual file system 300 as backup data to the new vendor agent 206, in step 508. The new vendor agent 206 may sweep through the virtual file system 300. However, the new vendor agent 206 sees the virtualized file system 300 as the entire directory hierarchy that needs to be backed up and uses the new vendors techniques to start the backup process. Further, as leaf entries (objects) in the virtualized file system 300 are opened, i.e. files are opened, the backup conversion module 220 can communicate with the API 210 to have the XBSA interface 204 send a BSAGetObject( ) call to obtain a handle to the legacy data object. In this way, the backup conversion module 220 can present other information to the new vendor agent 206 or prepare to send the object data to the new vendor agent 206.

Figure 6:
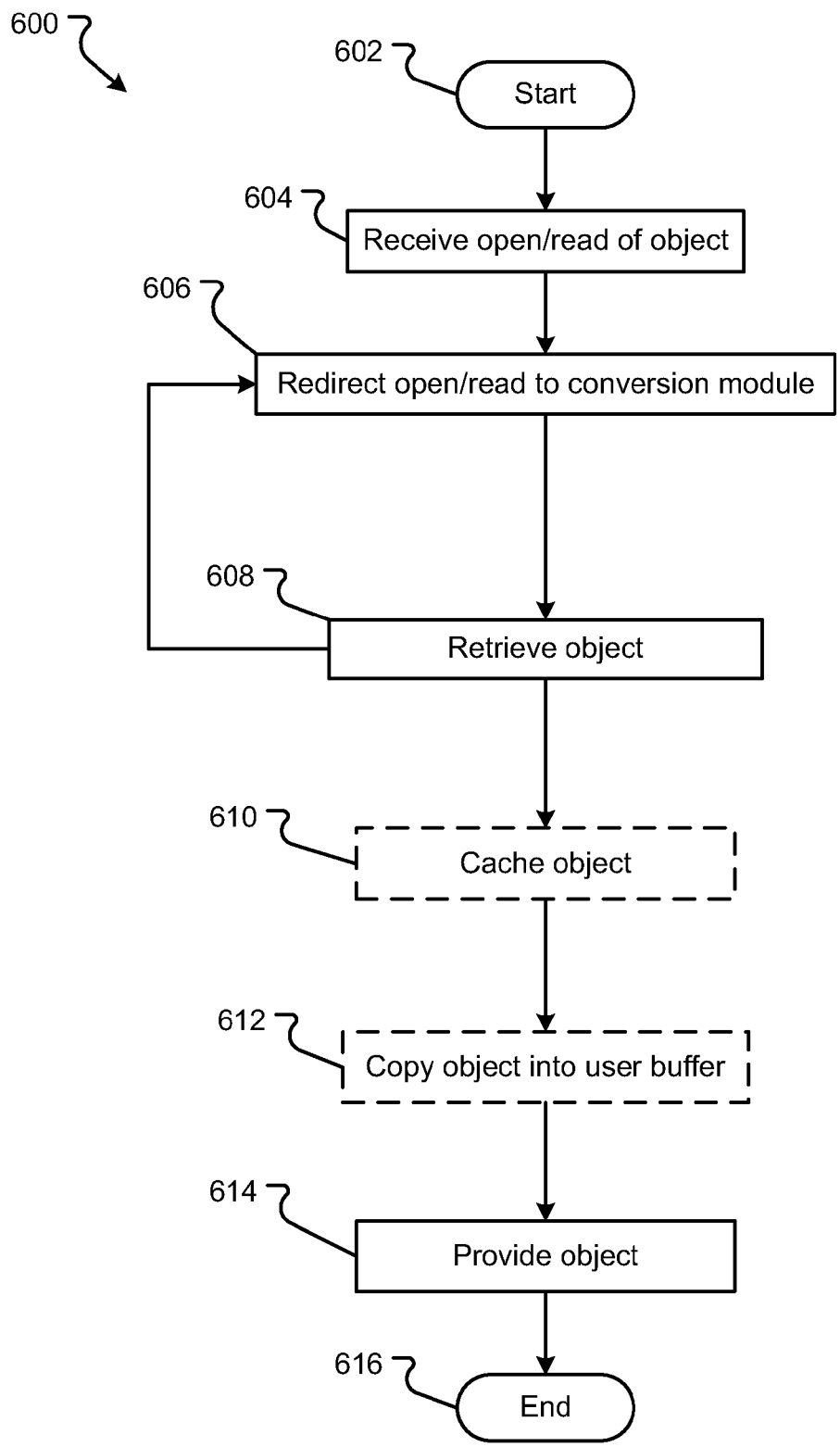
FIG. 6 is a flow diagram of an embodiment a process for converting backup data.

An embodiment of a process or method 600 for converting the legacy backup object data to a new vendor system is shown in FIG. 6. Generally, the method 600 begins with a start operation 602 and terminates with an end operation 616. While a general order for the steps of the method 600 are shown in FIG. 6, the method 600 can include more or fewer steps or arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, software, data structures, etc. described in conjunction with FIGS. 1-3.

The conversion process begins as the new vendor agent 206 begins opening files to read the data and store the data into the new vendor system 110. As leaf entries (objects) in the virtualized file system 300 are opened, the open/read request is received, in step 604. The FUSE module may receive the open/read request and redirect the request to the backup conversion module 220, in step 606. Thereinafter, the backup conversion module 220 can communicate with the API 210 to have the XBSA interface 204 send a BSAGetObject( ) call to obtain a handle to the legacy data object, in step 610. Further, the new vendor agent 206 can also send a read request, which is intercepted and sent to the backup conversion module 220. In response to a read request, the backup conversion module 220 can also communicate with the API 210 to have the XBSA interface 204 send a BSAGetData( ) call to obtain the data from the legacy vendor's media 108. The data returned by the XBSA interface 204 may be provided to the new vendor agent 206 by the backup conversion module 220, in step 614.

Optionally, the backup conversion module 220 can cache the returned object data, in step 610, and copy the data into a user buffer, in step 612. Thus, the backup conversion module 220 can read data ahead of the intercepted read commands and buffer data. The backup conversion module 220 can determine what data to "pre-read" by determining how the new vendor agent 206 is traversing the virtualized file system 300. The backup conversion module 220 can simply stay ahead of the new vendor agent 206 and cache or buffer the data for the new vendor agent 206. In further embodiments, the backup conversion module 220 may use several threads to read multiple files at once. Multithreading the read process speeds the conversion. When the backup conversion module 220 receives a close file call, the BSAEndData( ) can be sent to the XBSA interface 204 to release XBSA resources.

In embodiments, the virtual appliance 104 can be configured with multiple network gigabit interfaces to pull data from the legacy sources and feed data to the destination media server. The virtual appliance 104 can also be directly connected to a storage area network to backup to a SAN LUN or a tape device (via a virtual SCSI interface), as per the capabilities of the backup vendor software.

The conversion process proceeds like a normal backup mechanism for the new vendor agent 206 because all data is backed up to new media 112 under the control of the new vendor agent 206. Each canonical server name is cataloged under the backup directory name with all directories and files cataloged under the appropriate server name. Thus, the new vendor system stores the backed up data in the same format as the legacy system without needing to interface with the older system.

Figure 7:
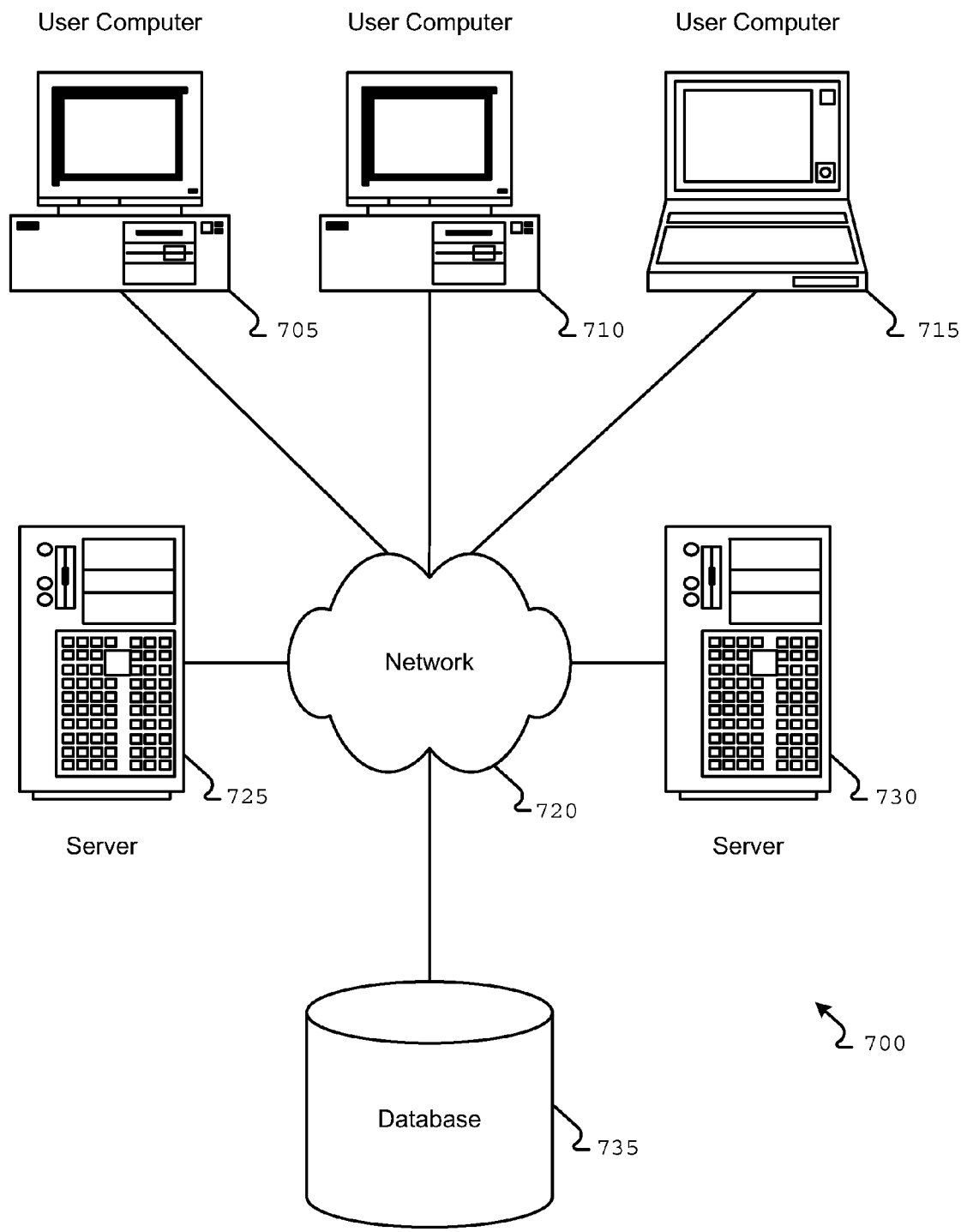
FIG. 7 is a block diagram of an embodiment of a computing environment.

FIG. 7 illustrates a block diagram of a computing environment 700 that may function as the servers, user computers, or other systems provided and described above. The environment 700 includes one or more user computers 705, 710, and 715. The user computers 705, 710, and 715 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, and/or personal digital assistant, capable of communicating via a network 720 and/or displaying and navigating web pages or other types of electronic documents. Although the exemplary computer environment 700 is shown with three user computers, any number of user computers may be supported.

Environment 700 further includes a network 720. The network 720 may can be any type of network familiar to those skilled in the art that can support data communications using any of a variety of commercially-available protocols, including without limitation SIP, TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server 725, 730. In this example, server 725 is shown as a web server and server 730 is shown as an application server. The web server 725, which may be used to process requests for web pages or other electronic documents from user computers 705, 710, and 715. The web server 725 can be running an operating system including any of those discussed above, as well as any commercially-available server operating systems. The web server 725 can also run a variety of server applications, including SIP servers, HTTP servers, FTP servers, CGI servers, database servers, Java servers, and the like. In some instances, the web server 725 may publish operations available operations as one or more web services.

The environment 700 may also include one or more file and or/application servers 730, which can, in addition to an operating system, include one or more applications accessible by a client running on one or more of the user computers 705, 710, 715. The server(s) 730 and/or 725 may be one or more general purpose computers capable of executing programs or scripts in response to the user computers 705, 710 and 715. As one example, the server 730, 725 may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the server 725 and/or 730 may be forwarded to a user computer 705 via a web (file) server 725, 730. Similarly, the web server 725 may be able to receive web page requests, web services invocations, and/or input data from a user computer 705 and can forward the web page requests and/or input data to the web (application) server 730. In further embodiments, the web server 730 may function as a file server. Although for ease of description, FIG. 7 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, web (file) server 725 and/or web (application) server 730 may function as the system, devices, or components described in FIGS. 1-3.

The environment 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. The database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. The database 735 may be a relational database, such as Oracle 10i™, that is adapted to store, update, and retrieve data in response to SQL-formatted commands.

Figure 8:
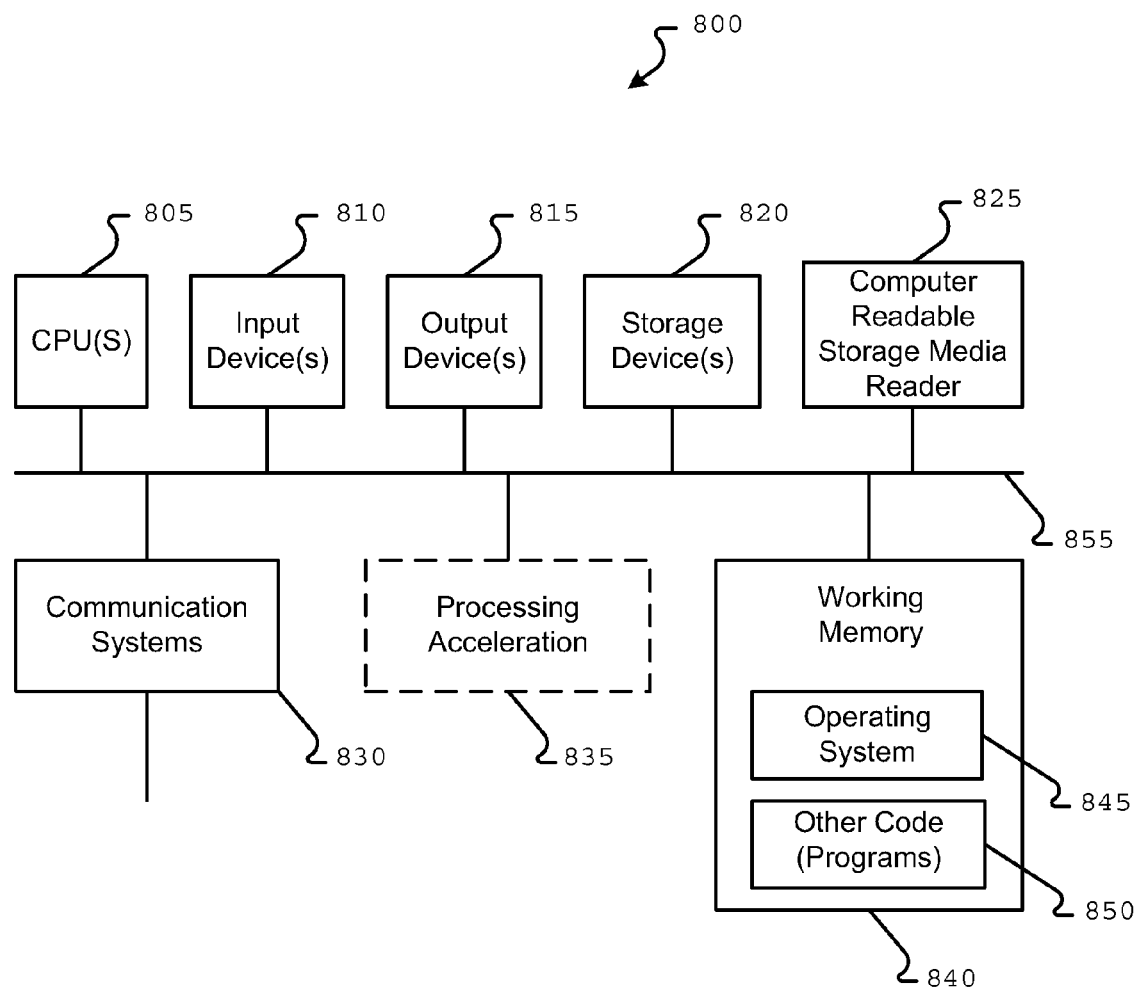
FIG. 8 is a block diagram of an embodiment of a computer system.

FIG. 8 illustrates one embodiment of a computer system 800 upon which the servers, user computers, or other systems or components described above may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage devices 820. By way of example, storage device(s) 820 may be disk drives, optical storage devices, solid-state storage devices such as a random access memory ("RAM") and/or a read-only memory ("ROM"), which can be programmable, flash-updateable and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. The computer system 800 may also include a processing acceleration unit 835, which can include a DSP, a special-purpose processor, and/or the like.

The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 720 (FIG. 7) and/or any other computer described above with respect to the computer system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 845 and/or other code 850. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In alternative embodiments, the the virtual appliance 104 is represented by many virtual IP addresses. The IP addresses may be assigned from a dynamic pool. Further the virtual appliance 104 may present many canonical names which correspond to the actual server names that exist in the legacy backup catalog. The backup conversion module 220 can present virtualized file system 300 as a mount point using the IP address. The IP address may be requested by the new vendor agent 206 in an incoming call. The IP address is then used by the backup conversion module 220 to present virtualized file system 300 of the canonical server names that correspond to the IP address. Thus, if a new vendor agent 206 connects to the virtual IP address, the new vendor agent 206 can only discover the original backup mount points and not the entire set of data under the legacy mount point. This arrangement can cause the cataloging process to catalog all legacy objects under their original server names as it would have appeared under the legacy backup product.

In embodiments, UML is used in the above situation. The "ubda=cow,root_fs" command line argument can be used to start up an UML instance tied to a canonical name/IP address to present a separate server instance. The backup client software is inherited by this process. The hostfs file-system is used to then mount the appropriate /legacy/serverX directory inside the UML instance. The new vendor agent 206 may be inherited via the root file-system into every UML instance. The new vendor agent 206 sees a set of directories specific to the original backed up server under each UML instance tied to the legacy server name Each UML instance has a unique IP address set up by connecting to the TAP/TUN device setup on the virtual appliance itself. When a given virtual IP is connected, traffic may be redirected to the UML instance serving that IP. The UML becomes a proxy for the equivalent legacy server data and the legacy server instance. The new vendor agent 206 runs inside the UML instance unaware of the virtualization. Then, the backup conversion module 220 provides the data from remote media.

In further embodiments, instead of using a new vendor agent 206, the the virtual appliance 104 may be exposed via NFS or CIFS, and or participate in a DFS namespace. Thus, the virtual appliance 104 can provide data as a file access point, either as a DFS target or as an automated recovery mechanism. To effect this configuration, the NFS software and/or Samba software can be installed in the the virtual appliance 104. As user selections are made, the canonical list is generated for the backup conversion module 220. Further, NFS and/or CIFS shares are also created—one share per selected server with all directories and files. Authentication can be configured through Active Directory, NIS, or OpenLDAP services. Users with proper permission can mount these network shares and recover files at will or transfer them to new location.

This alternative technique is valuable in situations where less frequently or lower value data has been backed up and then replaced by a stub. Some hierarchal storage management or policy based data migration environments use stubs to recall the file as needed. The stub will point to a share on the virtual appliance, which contains the object that represents the backup of the file.

There are various advantages of the embodiments presented herein. The above described processes integrate legacy backup software with new backup vendor software using an automated process embodied in a virtual machine. The virtual machine can be leveraged to move data on legacy media on demand, piece-meal, or in bulk. Exposing legacy backup data via standard file access protocols is also possible.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for copying backup data, the method comprising:
providing an appliance in communication with a legacy backup server and a second server, which also stores backup data, wherein the legacy backup server has a first type of interface and the second server has a second type of interface;
a processor of the appliance generating a virtualized directory representing the backup data in both the legacy backup server and the second server, wherein generating the virtualized directory includes:
scanning for one or more servers in communication with a network;
in response to the scanning, locating the legacy backup server;
sending a backup query to the located legacy backup server through the first type of interface;
receiving a response indicating that the legacy backup server has stored thereon a backup object;
mapping the one or more backup objects into the virtualized directory;
converting the backup object onto the second server;
eliminating access to the legacy backup server for the backup object;
the processor receiving a read request directed to the legacy backup server;
the processor intercepting the read request; and
the processor presenting the virtualized directory, wherein the virtualized directory represents at least one backup object stored in the legacy backup server.

2. The method as defined in claim 1, further comprising:
receiving a read request of a second backup object listed in the virtualized directory and stored in the legacy backup server;
redirecting the read request to a conversion module;
the conversion module retrieving the second backup object from the legacy backup server; and
providing the second backup object.

3. The method as defined in claim 2, further comprising:
before receiving a second read request, retrieving a third backup object from the backup server;
caching the third backup object; and
upon receiving the second read request, providing the third backup object from the cache.

4. The method as defined in claim 3, wherein the virtualized directory is created by a method comprising:
receiving a selection for backup;
issuing a query for the backup object of the legacy backup server;
storing an identifier returned in response to the query, wherein the identifier identifies an object stored in the legacy backup server; and
creating the virtualized directory, wherein information associated with the stored identifier identifying the backup object in virtualized directory.

5. The method as defined in claim 4, the method to create virtualized directory further comprising:
presenting the stored identifier to a user before creating the virtualized directory; and
receiving a selection from the user to backup the backup object associated with the stored identifier.

6. The method as defined in claim 5, the method to create virtualized directory further comprising:
determining if a second identifier is received in response to the query;
if a second identifier is received in response to the query, storing the second identifier; and
if a second identifier is not received in response to the query, presenting the stored identifier to the user before creating the virtualized directory.

7. The method as defined in claim 2, wherein conversion module retrieves the object from the legacy backup server through an XBSA interface that communicates with the legacy backup server, and wherein the XBSA interface issues a BSAGetObjecto command to retrieve the backup object.

8. The method as defined in claim 1, wherein the query is sent through an XBSA interface that communicates with the legacy backup server.

9. The method as defined in claim 8, wherein the query is a BSAQueryObject( ) command.

10. The method as defined in claim 1, wherein the virtualized directory is presented as a mount-point.

11. A non-transitory computer readable medium having stored thereon instructions that cause a computing system to execute a method for creating a virtualized directory of a legacy backup server, the instructions comprising:
- instructions to receive a selection for backup of at least a portion of data stored in the legacy backup server from a new vendor backup system, wherein the legacy backup server has a first interface that is different from a second interface associated with the new vendor backup system, wherein receiving a selection for backup includes:
  - instructions to scan for one or more servers in communication with a network;
  - in response to the scanning, instructions to locate the legacy backup server;
  - instructions to send a backup query to the located legacy backup server through the first type of interface;
  - instructions to receive a response indicating that the legacy backup server has stored thereon a backup object;
- instructions to receive a selection for backup of at least a portion of data stored in a second server from the new vendor backup system;
- instructions to issue a query for two or more backup objects stored in the legacy backup server;
- instructions to store an identifier, for each of the backup objects, returned in response to the query, wherein the identifier identifies the backup object stored in the legacy backup server;
- instructions to present the stored identifier to a user before creating the virtualized directory;
- instructions to receive a selection from the user to backup at least one backup object associated with at least one stored identifier; and
- instructions to create the virtualized directory from the at least one stored identifier, wherein the at least one stored identifier identifies the selected at least one backup object in the virtualized directory, and wherein at least one stored identifier, in the virtualized directory, identifies at least one backup object in the second server, and wherein at least one stored identifier, in the virtualized directory, identifies at least one backup object in the legacy backup server, wherein creating the virtualized directory includes:
  - mapping the at least one backup object into the virtualized directory;
  - converting the at least one backup object onto the second server;
  - eliminating access to the legacy backup server for the at least one backup object.

12. The computer readable medium as defined in claim 11, wherein the virtualized directory is presented to the new vendor backup system as a mount-point.

13. The computer readable medium as defined in claim 12, further comprising:
- instructions to execute a new vendor agent to communicate with the new vendor system, wherein the new vendor agent is configured to:
  - receive a read request, from the new vendor backup system, directed to the mount point, wherein the read request is associated with a stored identifier in the virtualized directory;
  - redirect the read request to a conversion module;
- instructions to execute the conversion module, the conversion module configured to:
  - retrieve the backup object from the legacy backup server associated with the stored identifier; and
  - provide the backup object to the new vendor agent to send to the new vendor backup system.

14. The computer readable medium as defined in claim 13, the conversion module further configured to:
- before receiving a second read request, determine that the new vendor backup system is requesting backup objects associated with the mount point;
- determine a next backup object to be requested by the new vendor backup system;
- retrieving the next backup object from the legacy backup server;
- caching the next backup object; and
- upon receiving the second read request, providing the next backup object from the cache.

15. The computer readable medium as defined in claim 14, the conversion module executing multiple threads wherein each thread retrieves a separate backup object before a next read request is received.

16. A backup appliance, comprising:
- a memory;
- a processor in communication with the memory, the processor configured to execute:
- a new vendor agent configured to communication with a new vendor backup system;
- a backup conversion module in communication with the new vendor agent, the backup conversion module configured to:
  - communicate with an XBSA Interface, wherein the XBSA Interface communicates with a legacy backup server;
  - create a virtualized directory of two or more legacy backup objects in the legacy backup server and a backup object in a second server, wherein, in creating the virtualized directory, the backup conversion module is further configured to:
    - scan for one or more servers in communication with a network;
    - in response to the scan, locate the legacy backup server;
    - send a backup query to the located legacy backup server through the XBSA Interface;
    - receive a response indicating that the legacy backup server has stored thereon one or more backup objects;
    - map the one or more backup objects into the virtualized directory;
    - convert the backup object onto the second server;
    - eliminate access to the legacy backup server for the backup object;
    - present the virtualized directory to the new vendor agent, wherein the new vendor agent incorporates the virtualized directory into a composite directory of legacy backup objects and backup object store in the new vendor backup system;
    - receive a read request for a legacy backup object listed in the virtualized directory;
    - request the legacy backup object from the XBSA Interface;
    - receive the legacy backup object; and
    - provide the legacy backup object to the new vendor agent to send to the new vendor backup system.

17. A backup appliance as defined in claim 16, wherein the backup conversion module comprises a directory constructor module, the directory constructor module configured to:
- traverse the legacy backup server to discover the two or more legacy backup objects, wherein the directory constructor module instructs the XBSA interface to issue a BSAQueryObject( ) function to find the two or more legacy backup objects;

receive information from the XBSA interface associated with the two or more legacy backup objects discovered by the BSAQueryObject( ) function; and construct the virtualized directory with the information associated with the two or more legacy backup objects.

18. A backup appliance as defined in claim 17, wherein the backup conversion module comprises a user interface module, the user interface module configured to:

present the information from the XBSA interface associated with the two or more legacy backup objects discovered by the BSAQueryObject( ) function to a user interface;

receive a selection for at least one of the two or more legacy backup objects to be backed up; and providing the selection to the directory constructor module to construct the virtualized directory.

19. A backup appliance as defined in claim 18, wherein the backup conversion module comprises a conversion engine, the conversion engine configured to:

intercept a copy request, directed to a legacy backup object stored in the legacy backup server, from the new vendor backup system;

reroute the copy request to the XBSA interface, wherein the XBSA interface retrieves the legacy backup object with a BSAGetData( ) function;

receive the legacy backup object from the XBSA interface; and provide the legacy backup object to the new vendor backup system.

20. A backup appliance as defined in claim 19, wherein the conversion engine is further configured to provide the new vendor backup system with the virtualized directory, wherein the virtualized directory is presented as a mount point to in a file system.

\* \* \* \* \*

UNITED STATES PATENT AND TRADEMARK OFFICE
CERTIFICATE OF CORRECTION

PATENT NO.         : 9,239,840 B1
APPLICATION NO.    : 13/104179
DATED              : January 19, 2016
INVENTOR(S)        : Soubir Acharya Page 1 of 1

It is certified that error appears in the above-identified patent and that said Letters Patent is hereby corrected as shown below:

IN THE CLAIMS

• In Column 18, Line 60 (Claim 7), please delete "BSAGetObjecto" and insert -- BSAGetObject() -- command to retrieve the backup object.

Signed and Sealed this
Nineteenth Day of April, 2016

Michelle K. Lee
*Director of the United States Patent and Trademark Office*